United States Patent [19]

Hayden

[11] Patent Number: 5,049,114
[45] Date of Patent: Sep. 17, 1991

[54] SELF-ADJUSTING CHAIN GUIDE TENSIONER

[76] Inventor: Tom Hayden, 2999 Twin Oak Pl. NW., Salem, Oreg. 97304

[21] Appl. No.: 496,604

[22] Filed: Mar. 21, 1990

[51] Int. Cl.⁵ .............................................. F16H 7/08
[52] U.S. Cl. .................................. 474/111; 474/138; 180/231
[58] Field of Search ............... 474/101, 111, 136, 138, 474/117; 180/231

[56] References Cited

U.S. PATENT DOCUMENTS 3,960,026  6/1976  Hibino ................................. 474/111
4,425,103  1/1984  Foster ................................. 474/138
4,713,043  12/1987  Biedermann ........................ 474/111

Primary Examiner—Ramon S. Britts
Assistant Examiner—Roger J. Schoeppel
Attorney, Agent, or Firm—Charles N. Hilke

[57] ABSTRACT

A self-adjusting chain tensioning device comprising a spring loaded rubbing block in continuous contact with said chain. Shims are used to preload or pre-compress said spring or springs. The rubbing block and shims are horizontally fixed but vertically slideable within an inner slide plate and an outer slide plate. Means to fixably position the inner slide plate and outer slide plate are provided.

4 Claims, 2 Drawing Sheets

SELF-ADJUSTING CHAIN GUIDE TENSIONER

BACKGROUND OF THE INVENTION

1. Field of the Invention

The present invention relates to an apparatus for maintaining chain tension and, more particularly, to a self-adjusting chain tensioning device for a motorcycle.

2. Prior Art

In general, it is known in the prior art to provide chain tensioning devices. Such devices are used to adjust for the natural stretch of the chain. Additionally, particularly in motorcycle chain drives, vibration occurs in normal operation. Especially when power is provided or eliminated to the drive sprocket, the chain may be taut on the top or bottom. In Scalise, U.S. Pat. No. 3,838,606, a spring-loaded pivot arm with a guide block is provided to adjust tension. A spring-load tensioner for use in automotive engines is disclosed in U.S. Pat. No. 4,767,385. Examples of other chain tensioning devices of interest are provided in the following patents:

U.S. Pat. No. 4,662,862—Matson
U.S. Pat. No. 4,713,043—Biedermann
U.S. Pat. No. 4,553,509—Mezger, et al.
U.S. Pat. No. 4,530,681—Kurats, et al.
U.S. Pat. No. 4,505,691—Kohler The prior art does not disclose an effective simple mechanism for control of vibration, particularly in motorcycle chains.

SUMMARY OF INVENTION

A rubbing block is provided with indentations such that the rubbing block is free to along the vertical axis but not the horizontal axis. Springs are provided between the base of the rubbing block and shims. The number of shims is adjusted to provide a pre-load compressive force to the springs.

It is an object of this invention to provide an efficient, simple chain tensioner.

It is another object to provide a quick reacting chain tensioner.

It is a final object to provide a chain tensioner which damps the natural vibration in a motorcycle primary chain.

DETAILED DESCRIPTION OF THE PREFERRED EMBODIMENT

Figure 1:
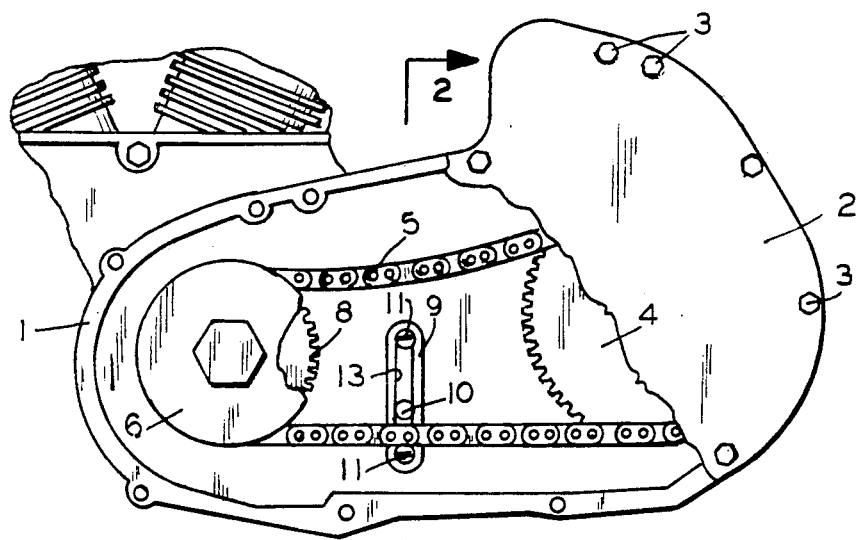
FIG. 1 is a cut away view of the prior art chain tensioning device.
Figure 2:
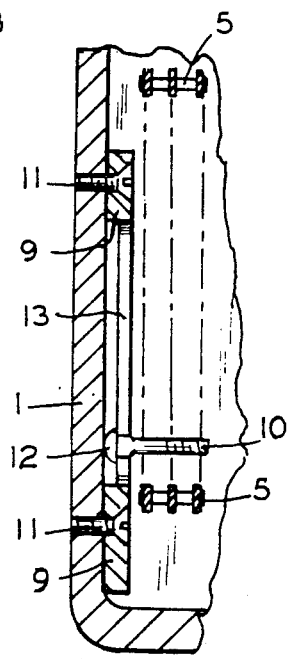
FIG. 2 is a view along line 2—2 of FIG. 1 which shows a side view of the prior art chain tensioning device.
Figure 3:
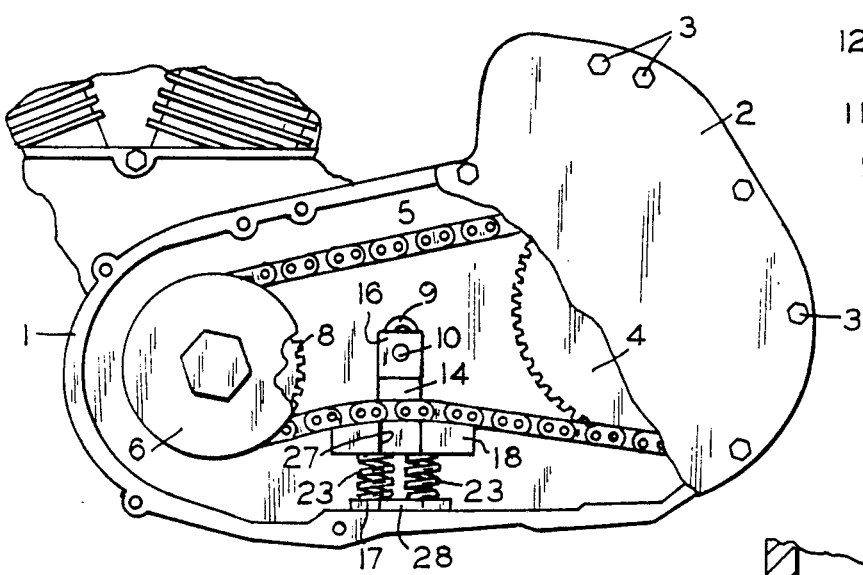
FIG. 3 is a cut away view of a portion of the chain tensioning device.
Figure 4:
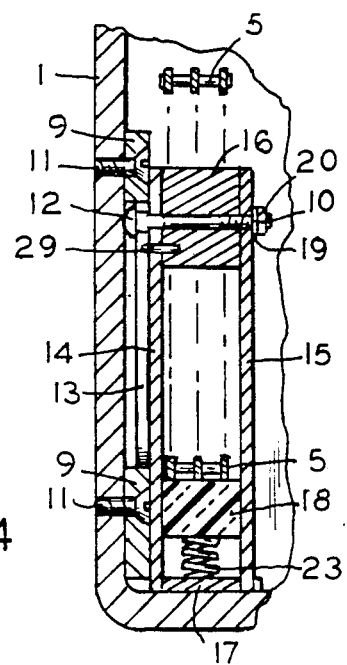
FIG. 4 is a view along line 4—4 of FIG. 5 which shows a side view of the chain tensioning device.
Figure 5:
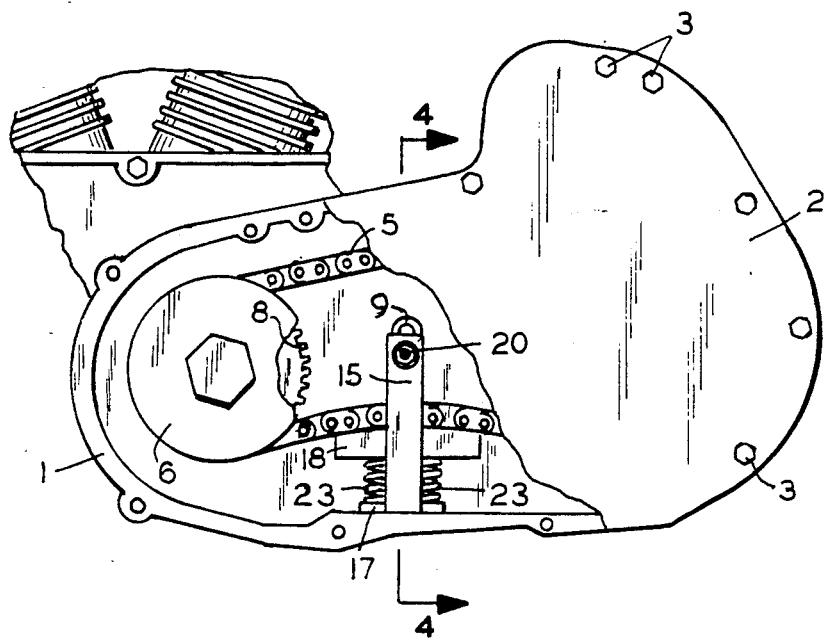
FIG. 5 is a cut away view of the chain tensioning device.

FIG. 1 and FIG. 2, with a fixed rubbing block removed, show the present means for controlling chain tensioning on motorcycles, for example, Harley Davidson primary chain. A case 1 with cover 2 encloses the drive sprocket 6 and rear wheel sprocket 4. The cover 2 is removable from the case 1 by removal of the plate nuts 3. A double row chain 5 joins the drive sprocket 6 and rear wheel sprocket 4 together. As is usual, the drive sprocket teeth 8 fit into the spaces in the double row chain 5 and similarly the rear sprocket teeth 6 fit into the spaces in the double row chain 5. Slotted plate 9 is attached to the case 1 by means of slotted plate fasteners 11. A carriage bolt 10 with a carriage bolt head 12 slides up and down within the slot 13 of the slotted plate 9. The carriage bolt 10 is meant to lock unit in place.

Figure 6:
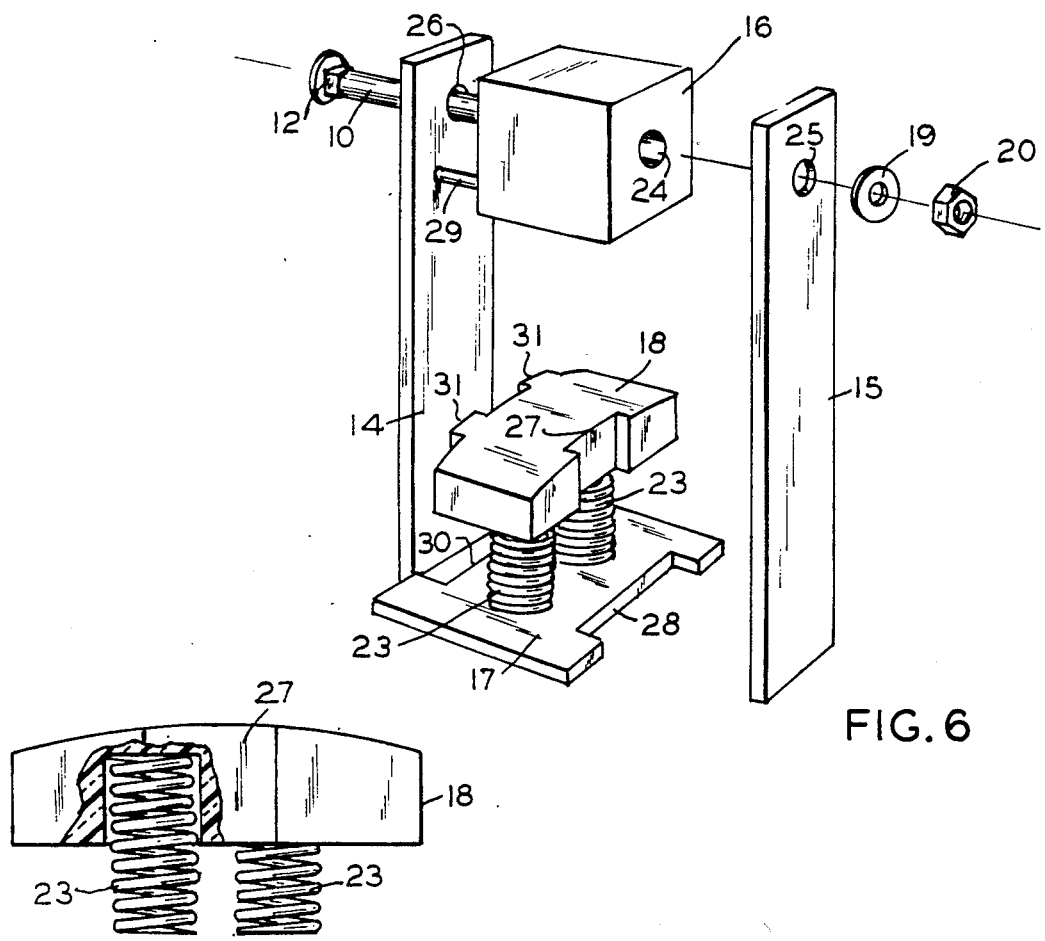
FIG. 6 is a perspective view of the chain tensioning device.
Figure 7:
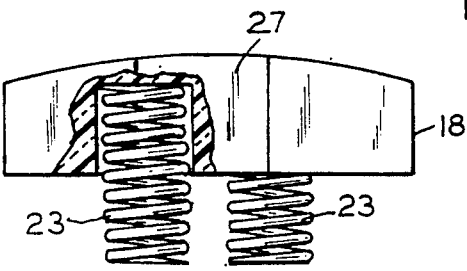
FIG. 7 is a detail view of the rubbing block and springs.

FIGS. 3 through 7 show the new chain tensioner. Referring first to FIG. 6, an inner slide plate 14 is joined to top block 16 by pins 29. One of the pins 29 is flush with the back side of the inner slide plate 14. The other pin 29 extends out beyond the back side of inner slide plate 14 to provide stability. Shim or shims 17 rests on the bottom of the case 1. Two springs 23 rest on the bottom of shim 17 and extend into the rubbing block 18 as is shown in FIG. 8. The shim 17 contains shim outer slide plate indentation 28 and shim inner slide plate indentation 30. The outer slide plate 15 slides into the shim outer slide plate indentation 28 and the inner slide plate 14 slides into the shim inner slide plate indentation 30. The rubbing block 18 contains prongs 31 between which the inner slide plate 14 slides. Additionally, rubbing block outer slide plate indentation 27 fits around outer slide plate 15. Carriage bolt 10 with carriage bolt head 12 within the slot 13 of the slotted plate 9 fits through the inner slide plate hole 26, the top block hole 24, and the outer slide plate hole 25 where it is held by a washer 19 and nut 20. The outer slide plate 15 also rests on the bottom of the case 1 as does the inner slide plate 14.

As can be seen, the springs 23 push the rubbing block 18 upwards against the chain 5 acting as a chain tensioner. Depending upon the forces in the chain 5 the rubbing block 18 will move up and down against the springs 23.

The compressive force of the springs 23 can be controlled by the number or thickness of the shims 17.

Additionally, while the shims 17 have been placed on the bottom of the case 1, it is possible to reverse the positioning of the shims 17 against the top block 16 such that the chain 5 is pushed towards the bottom of the case 1. This can be a preferrable arrangement because of the natural movement of the chain 5 leaving the the drive sprocket 6.

I claim:
1. A chain tensioning device comprising:
   a) means for containing within one axis a rubbing block in contact with a movable chain where said means comprise;
      i) a slotted plate fixably attached to a case;
      ii) a carriage bolt with a carriage bolt head vertically movable within a slot of said slotted plate;
      iii) an inner slide plate, top block and outer slide plate fixably attached to said carriage bolt by a nut; and
   b) means for movably positioning on another axis said rubbing block in contact with said movable chain.
2. The chain tensioning device of claim 1 where said rubbing block comprises prongs adjacent to said inner slide plate and rubbing block outer slide plate indentation through which said outer slide plate fits.

3. The chain tensioning device of claim 1 where said means for movably positioning on another axis said rubbing block comprises:

c) at least one spring between a shim resting on the bottom of a case and a rubbing block;

d) an inner slide plate and an outer slide plate attached to said case by means of said carriage bolt and said slotted plate where a rubbing block slideably fits between said outer slide plate;

e) prongs from said rubbing block adjacent to said inner slide plate;

f) a rubbing block outer slide plate indentation within said rubbing block which allows said rubbing block to slide up and down on said outer slide plate; and g) A shim, resting on the bottom of said case, where said inner slide plate also resting on the bottom of said case is within a shim inner slide plate indentation and where said outer slide plate also resting on the bottom of said case is within a shim outer slide plate indentation.

4. The chain tensioning device of claim 3 where two springs are centered on each end of said rubbing block outer slide plate indentation.

* * * * *